Figure 1:
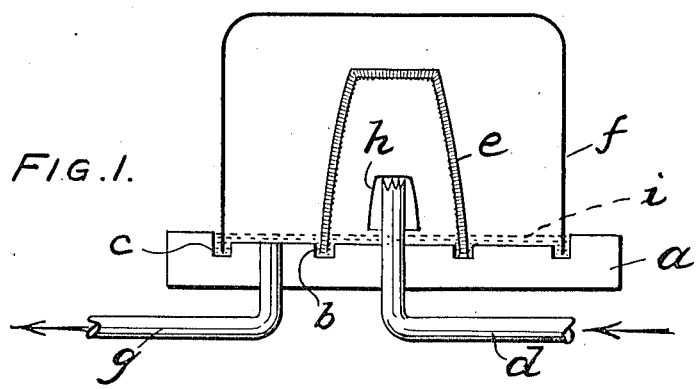

A. HENWOOD.
CATALYZER.
APPLICATION FILED JUNE 25, 1918.

1,309,623.

Patented July 15, 1919.

WITNESS:

INVENTOR
Abraham Henwood
BY
Frank Busser
ATTORNEY.

UNITED STATES PATENT OFFICE.

ABRAHAM HENWOOD, OF CYNWYD, PENNSYLVANIA.

CATALYZER.

1,309,623.

Specification of Letters Patent.   Patented July 15, 1919.

Application filed June 25, 1918. Serial No. 241,724.

*To all whom it may concern:*

Be it known that I, ABRAHAM HENWOOD, a citizen of the United States, residing at Cynwyd, county of Montgomery, and State of Pennsylvania, have invented a new and useful Improvement in Catalyzers, of which the following is a full, clear, and exact description, reference being had to the accompanying drawings, which form a part of this specification.

In any process for effecting a chemical combination of gases by catalysis, as, for example, the formation of nitric acid from ammonia and oxygen, or of sulfuric anhydrid from sulfurous anhydrid and oxygen, it is recognized that the chemical action takes place at the surface of the catalytic material. When, therefore, the catalytic material is expensive or difficult to obtain, it is obviously desirable that it should present to the gases to be combined the greatest possible area proportionate to its bulk.

There are other reasons which imperatively require the avoidance of a superfluous bulk of the catalytic material. Thus, the tendency is for the catalyzer to become very highly heated during the reaction, and even at a moderately high temperature the product of the reaction decomposes, as illustrated, in the case of nitric acid, by the following equation:

$$2HNO_3 = 2H_2O + 4NO_2 + O_2$$

Assuming a catalyzer of requisite activity, such as platinum, the greater its bulk or mass, the greater its capacity for holding heat; and hence the higher the temperature the greater the decomposition.

The art has recognized the advisability of presenting a relatively large surface of catalytic material to the gases to be combined, but has effected no more than an approach toward the ideal condition, and in some instances the object sought has been partially attained only at the expense of creating other deleterious conditions obstructive of successful operation. A few examples will suffice.

Platinum and other metals have been used as catalyzers in the shape of fine screens. Such catalyzers have the advantage of a uniform distribution of the orifices through which the gases pass, thereby largely avoiding the unequal elevation of temperature in different parts of the catalyzer; but however fine the mesh may practically be, it is clear that a large part of the catalytic material is not at the surface and therefore is practically inert. But such inactive part of the material acts to absorb and retain heat, and hence the temperature elevation exceeds the safe minimum. Moreover, where platinum is employed, the cost of the material is excessive. These objections apply with still greater force where the gases are passed through a tube of platinum contained within a tube of alundum.

One of the most efficient catalyzers known in the sulfuric acid contact process is that formed by the deposition of platinum on granular magnesium sulfate or other salt or mixture of salts. In the preparation of this catalyzer, however, it is found impossible to even approximately completely coat the granular base, the platinum being deposited discontinuously so as to cover actually a relatively small part of the surface of the grains, thus not only necessitating the use of a considerable bulk of the material, but reducing the efficiency of the catalyzer, in that the reacting gases cannot pass through the salts without contacting with a relatively large surface of inert or non-catalytic material. The same objections apply to a catalyzer formed by the deposition of nickel on finely divided charcoal.

Platinum sponge in such bulk as to be self-sustaining has also been proposed, and is an efficient catalyzer, but it is open, in less degree, to the objections applicable to platinum screens, in that a large proportion of the mass is below the surface and inactive. Substantially the same objections apply to a mixture of thorium oxid and radio active uranium oxid applied to fire clay or porcelain.

Platinized asbestos has also been successfully employed, but the asbestos, like the magnesium salts, has been coated in a pronouncedly discontinuous manner. Platinized porous clay has also been proposed, but is open to the same objection. Another objection common to platinized asbestos and platinum sponge (as ordinarily used) and other catalyzers is that the interstices are not regularly distributed and a larger volume of gases passes through the wider channels than through the more restricted ones, thereby causing an unequal heating of the mass, and rendering it impossible to maintain the whole mass at any uniform temperature and therefore making it impossible to hold the whole mass at the relatively low temperature required to prevent partial decomposition.

The object of my invention is to prepare a continuous porous or permeable contact or reaction surface, or diaphragm, of catalytic material, preferably platinum, over or through which all the gases must pass, and of a mass so small as not to be self-sustaining and which is distributed uniformly over the surface of a porous or permeable material which is preferably non-metallic, non-catalytic, and a poor conductor of heat.

A base or support of such material of any suitable shape, so covered with a coating, film or diaphragm of platinum, is placed in the channel provided for the reaction gases so that the latter must pass over or through the same and hence be brought into reactive contact with the continuous surface of platinum. Thus I attain maximum economy, even distribution, minimum mass and uniform temperature, and insure that practically every molecule of the reaction gases will be subjected, and in the same degree, to the influence of the catalyzer.

In preparing my improved catalyzer, I take a support, which may be in the shape of a disk, hemisphere, tube, or any other shape, made of porous or permeable material, such as alundum or silica. The catalytic material, preferably platinum, is deposited, formed or placed, on either or both surfaces of the support, but preferably only on one surface. The catalytic material may be applied in various ways, as by impregnating with suitable materials together with surface application of a supplemental material, by spraying, or otherwise, followed, when necessary, by chemical reaction of the materials used by the application of heat or by the action of reducing agents, gaseous or in solution, so that there results a continuous coating or surface of the desired catalytic material of regulated and desired thickness.

A preferred procedure is to soak an alundum support in ammonium chlorid, dry it, remove any excess from the surface, spray upon the surface a platinum chlorid solution, thereby forming on the surface a precipitate of ammonium chlorplatinate, and then dry and ignite, thus burning off or volatilizing ammonia, hydrogen chlorid, steam and chlorin, and leaving a superficial layer of platinum sponge.

The only serious difficulty presented by the use of a catalyzer of this character is the provision of means to prevent cracking of the support due to expansion and contraction resulting from variation of temperature at the beginning and end of a run. I have overcome this difficulty by several expedients presenting features in common, the one decidedly preferred being the sealing of the catalytic support by means of a plastic lute, composed of a vitreous substance of the proper degree of viscosity at the working temperature and which is chemically inert to the reaction gases. This, while providing an hermetical seal, allows the support to expand as it is heated and contract as it cools.

Figure 2:
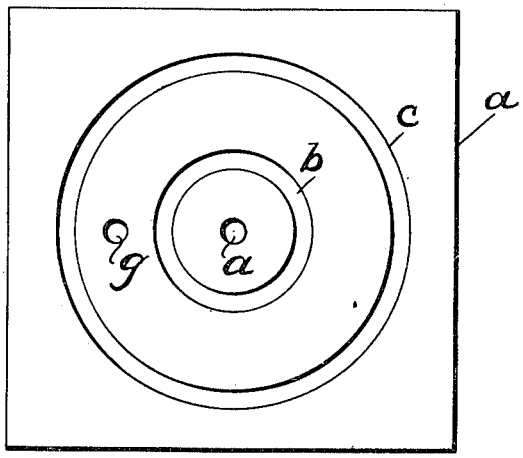
Figure 3:
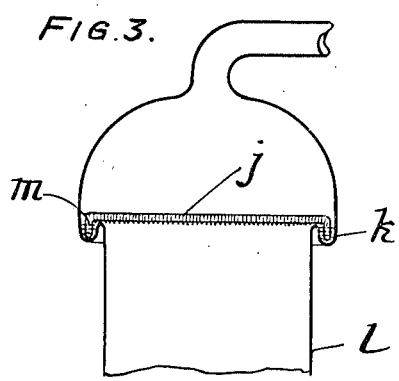
Figure 4:
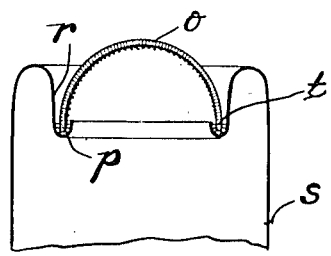

The drawings show several embodiments of the invention, so far as it is capable of being illustrated by drawings:

Figure 1 is a vertical section through a gas passage containing one form of catalyzer embodying my invention. Fig. 2 is a plan view of the bottom of the reaction chamber. Fig. 3 is a vertical sectional view showing another form of the invention. Fig. 4 is a similar view showing a third form.

Referring first to Figs. 1 and 2: Through a base $a$ provided with two concentric grooves $b$ and $c$ extends an inlet pipe $d$, through which are admitted the gases of reaction. A catalyzer support $e$, of inverted cup shape, coated on its inside with catalytic material as above described, rests in the inner groove. The support may be composed of alundum. A cover $f$, of pyrex glass, overlies and surrounds, and is spaced from, the support $e$, and rests in the groove $c$. An outlet pipe $g$ for the product of the reaction extends through the base $a$ and communicates with the space between the cover $f$ and support $e$. A hood or deflector $h$ is placed over the mouth of the inlet pipe $d$ to distribute the entering gases within the chamber inclosed by the support $e$ preparatory to their passage through the cup. Neither the cup $e$ nor the cover $f$ is rigidly attached to the base of its groove or to the side walls of the groove, but is embedded in a plastic lute $i$, of boric acid or other substance which, while providing an hermetical seal, allows the cup or cover to expand or contract. In other words, the supported edge of the cup or cover is not supported or sealed rigidly, but is held flexibly. I prefer to flow the boric acid over the surface of the base so that it will fill and overflow the grooves and provide a protective covering or enamel for the bottom of the reaction chamber. Boric acid is well adapted for use either in the formation of nitric acid or sulfuric acid. It is plastic, vitreous, has a high degree of viscosity within the range of working temperatures, and is chemically inert to ammonia and acids. The invention is not limited, however, to the use of boric acid, as other substances are available.

In Fig. 3 the catalyzer support, which may be of silica, is made in the shape of a disk $j$ having a depending circumferential flange resting in a groove $k$ formed in the wall of the reaction chamber or channel $l$. The channel $l$ may be made of iron with its inner wall enameled. The groove $k$ contains a plastic lute $m$.

In Fig. 4, the catalyzer support $o$ is of inverted cup-shape, as in Fig. 1, its lower edge extending into a groove $p$ formed by bending out the lower edge of an inwardly and downwardly bent extension $r$ of the wall of the reaction chamber $s$. The groove $p$ contains a rigid cement $t$. In this modification, while the lute is rigid, the extension $r$ is sufficiently thin to have enough inherent elasticity to allow the support $o$ to expand and contract.

This invention contains subject-matter disclosed in my application Serial No. 179,804, filed July 11, 1917. Nothing therein claimed is claimed herein. Nor do I claim herein the herein described processes of catalytically combining gases and particularly oxidizing ammonia to nitric acid, as these form the subject-matter of applications Serial No. 243,758, filed July 8, 1918, and Serial No. 270,410, filed January 9, 1918.

Having now fully described my invention, what I claim and desire to protect by Letters Patent is—

1. Means for catalytically combining gases comprising a gas passage and a catalytic structure consisting of a porous support presenting an extended surface and spanning the passage in such manner as to compel the gases to pass through it and a permeable catalyzer distributed over the surface of the support and through which also the gases are compelled to pass, the catalyzer presenting a substantially continuous surface and of negligible thickness, whereby practically its entire catalytic mass is rendered active.

2. Means for catalytically combining gases comprising a gas passage and a diaphragm of catalytic material so positioned in the passage as to compel the gases to pass therethrough and of such negligible thickness that substantially the entire mass of the catalytic is active.

3. Means for catalytically combining gases comprising a gas passage and a substantially continuous permeable diaphragm consisting wholly of platinum sponge so positioned in said passage as to compel the gases to pass therethrough.

4. Means for catalytically combining gases comprising a gas passage and a catalyzer therein consisting of a porous diaphragm presenting an extended and substantially continuous surface of such negligible thickness that substantially the entire mass is active.

5. Means for catalytically combining gases comprising a gas passage and a catalytic structure so positioned in the passage as to compel the gases to pass therethrough, said catalytic structure consisting of a porous catalyzer support presenting an extended surface and a permeable catalyzer distributed over the surface of the support of such negligible thickness that substantially the entire mass of the catalyzer is active.

6. The combination with means forming a passage for reaction gases, of a rigid porous catalyzer support closing said passage and therefore compelling the gases to pass through the support, and a permeable catalyzer distributed substantially continuously over the surface of the support in the path of the gases and of such negligible thickness that substantially the entire mass of the catalyzer is active.

7. Means for catalytically combining gases comprising a gas passage, a porous non-catalytic support and a permeable layer consisting wholly of platinum sponge held superficially on the support, the latter being so positioned in said passage as to compel the gases to pass through both the support and the catalyzer.

8. The combination with a rigid catalyzer support, of means to retain the support, adapted to yield or flex to allow for the expansion and contraction of the support.

9. The combination with a rigid catalyzer support, of retaining means for the support comprising a lute of plastic material having sufficient viscosity to allow for the expansion and contraction of the support.

10. The combination with a rigid catalyzer support, of means forming a groove to receive the edge of the support, and plastic viscous material within the groove and inclosing said edge.

11. The combination with a gas reaction passage, of a porous catalyzer support extending across said passage, and means retaining the edge of the support and adapted to yield or flex as the support expands or contracts.

12. The combination with a gas reaction passage, of a porous catalyzer support extending across said passage, and means comprising plastic and viscous material closing the passage against the flow of gases around the support and flexibly retaining the support to allow for its contraction and expansion.

In testimony of which invention I have hereunto set my hand, at Philadelphia, on this 22nd day of June, 1918.

ABRAHAM HENWOOD.